United States Patent
Brittan

(10) Patent No.: US 11,601,291 B2
(45) Date of Patent: Mar. 7, 2023

(54) AUTHENTICATION METHOD AND DEVICE FOR MATRIX PATTERN AUTHENTICATION

(71) Applicant: V-Auth Limited, Cambridge (GB)

(72) Inventor: Steven Jonathan Brittan, Dymock (GB)

(73) Assignee: V-Auth Limited, Cambridge (GB)

( * ) Notice: Subject to any disclaimer, the term of this patent is extended or adjusted under 35 U.S.C. 154(b) by 0 days.

(21) Appl. No.: 15/733,242

(22) PCT Filed: Dec. 14, 2018

(86) PCT No.: PCT/GB2018/053631
§ 371 (c)(1),
(2) Date: Jun. 16, 2020

(87) PCT Pub. No.: WO2019/122827
PCT Pub. Date: Jun. 27, 2019

(65) Prior Publication Data
US 2020/0344076 A1  Oct. 29, 2020

(30) Foreign Application Priority Data
Dec. 18, 2017 (GB) ..................................... 1721218

(51) Int. Cl.
*H04L 9/32* (2006.01)
*H04L 9/06* (2006.01)
(Continued)

(52) U.S. Cl.
CPC .......... *H04L 9/3271* (2013.01); *H04L 9/0631* (2013.01); *H04L 9/0637* (2013.01);
(Continued)

(58) Field of Classification Search
None
See application file for complete search history.

(56) References Cited

U.S. PATENT DOCUMENTS 10,296,764 B1 *  5/2019  Batishchev ........... G06Q 10/105
10,867,057 B1 * 12/2020  Knas ....................... G06F 21/44
(Continued)

FOREIGN PATENT DOCUMENTS

| EP | 1 149 475 A1 | 10/2001 |
|---|---|---|
| GB | 2504746 A | 9/2012 |

(Continued)

OTHER PUBLICATIONS

United Kingdom Patent Application GB1721218.4 Search Report dated Jun. 1, 2020. 1 page.

(Continued)

*Primary Examiner* — Bassam A Noaman
(74) *Attorney, Agent, or Firm* — Woodard, Emhardt, Henry, Reeves & Wagner, LLP

(57) ABSTRACT

A method of encoding and/or decoding data is described, having the steps of: generating a challenge code, the challenge code being based on a pattern associated with at least one challenge arrangement having duplicated signs, encrypting the challenge code using a one-way hashing function to obtain a temporary encryption key, generating encoded data by encoding the data using a two-way transcoding function using the obtained temporary encryption key, wherein data is decoded using the two-way transcoding function and a subsequently obtained user temporary encryption key when the subsequently obtained user temporary encryption key matches the previously obtained temporary encryption key used to encode the data.

33 Claims, 11 Drawing Sheets

(51) Int. Cl.
*H04L 9/08* (2006.01)
*H04L 9/00* (2022.01)

(52) U.S. Cl.
CPC .......... *H04L 9/0643* (2013.01); *H04L 9/0866* (2013.01); *H04L 9/0894* (2013.01); *H04L 9/3228* (2013.01); *H04L 9/50* (2022.05)

(56) References Cited

U.S. PATENT DOCUMENTS

| | | | | |
|---|---|---|---|---|
| 2007/0269041 | A1* | 11/2007 | Bhatnagar | H04L 9/0825 |
| | | | | 380/30 |
| 2007/0300080 | A1* | 12/2007 | Brown | H04L 9/0825 |
| | | | | 713/193 |
| 2010/0287382 | A1 | 11/2010 | Gyorffy et al. | |
| 2013/0024695 | A1* | 1/2013 | Kandrasheu | H04L 9/006 |
| | | | | 713/175 |
| 2013/0185778 | A1 | 7/2013 | Tamai et al. | |
| 2014/0101451 | A1* | 4/2014 | Chan | H04L 67/1095 |
| | | | | 713/171 |
| 2015/0254640 | A1* | 9/2015 | Cassano | G06Q 20/3672 |
| | | | | 705/71 |
| 2015/0295717 | A1* | 10/2015 | Brittan | H04L 9/3226 |
| | | | | 713/168 |
| 2015/0304302 | A1* | 10/2015 | Zhang | H04L 63/083 |
| | | | | 713/171 |
| 2017/0372087 | A1* | 12/2017 | Lee | H04L 9/14 |
| 2018/0167200 | A1* | 6/2018 | High | A61B 5/1171 |
| 2018/0219674 | A1* | 8/2018 | Mullins | H04L 9/0861 |
| 2019/0132138 | A1* | 5/2019 | Finlow-Bates | H04L 67/1097 |

FOREIGN PATENT DOCUMENTS

| | | |
|---|---|---|
| TW | 201541925 A | 11/2015 |
| WO | 2000051244 A1 | 8/2000 |

OTHER PUBLICATIONS

GB IPO, Examination Report under Section 18(3) for Great Britain Patent App. No. GB1721218.4, 4 pages, dated Jun. 15, 2021.

* cited by examiner

AUTHENTICATION METHOD AND DEVICE FOR MATRIX PATTERN AUTHENTICATION

The present disclosure relates to authentication and/or encoding/decoding methods and systems and to parts thereof. The present disclosure relates particularly but not exclusively to Matrix Pattern Authentication or equivalents or derivatives thereof. Certain aspects of the disclosure described may be applied to any form of secret information other than Matrix Pattern Authentication, where safeguarding the secret information is important; including passwords, passcodes, and personal information, including biometric information. The disclosure has particular although not exclusive relevance to personal authentication as an alternative to passwords and Personal Identification Numbers for computerized systems, embedded systems (e.g. for authentication/unlocking to computers and mobile devices), online identification or credit card payment, or any other authentication/unlocking process to any other device or process, such as e.g. to launch, or control access to, any third party applications on a device as a non-limiting example.

Authentication is a process by which a user validates that they are legitimate, and may access, e.g. a secure service or transaction, protected by an authentication scheme. Matrix Pattern Authentication (MPA) is a generic term describing a form of known authentication which is an alternative to passwords and Personal Identification Numbers (PIN).

FIGS. 1A and 1B show matrices 100 used in a MPA, and comprising elements 101. In the case of FIG. 1A, the matrix 100 is a square pattern of 25 elements 101, and in the case of FIG. 1B, the matrix 100 is a line (i.e. a linear matrix) of 12 elements 101. FIGS. 2A and 2B show that each matrix 100 is a basic template which a human user employs in order to select a memorable identification pattern (MIP) shown as arrowed and colored. It should be understood that other sizes of matrices and other form factors are possible, depending on the level of security required, and how easy it needs to be for a human user to recall their MIP.

In the context of MPA, the term entropy refers to the degree of variability that a given MPA design will afford humans in their selection of their MIP. Thus a grid, say of 25 elements in a 5×5 matrix as in FIG. 1A, may be used. If a user was to select a MIP of five elements from the matrix, one could theoretically calculate that there would be $25^5=9,765,625$ unique possible combinations for any individual MIP.

FIGS. 3A and 3B show that, in an authentication operation, a challenge matrix 200 is generated by an authentication system and presented to the user. The challenge matrix 200 is populated with a randomized set of signs, such as numbers, letters, or other logos. In the case of FIG. 3A, the matrix 200 is a square pattern of 25 elements 201, with numbers 1, 2, 3, 4 and 5, and in the case of FIG. 3B, the matrix 200 is a linear matrix of 12 elements 201, with letters A, B, C, D, E and F. The user then enters, in a dedicated space of an interface, separate from the matrix 200, the signs corresponding to their secret MIP and which appear in the matrix elements 201, in the correct order in which the signs appear in their MIP. In the case of FIG. 3A, the user would enter the code "1, 2, 3, 4, 5", and in the case of FIG. 3B, the user would enter the code "BFCE".

The MIP is only known to the user, and it is critical that the pattern is never divulged. For effective security, it is essential that the signs presented in a challenge matrix 200 for an authentication operation are in some way randomized at each authentication operation. Thus the code entered by the user has the desirable property that the code changes on each authentication operation—this is denoted by the term one-time code (OTC). Further, it is an essential feature of all matrix pattern authentication approaches that each sign in a matrix is repeated more than once, and preferably many times. This is to ensure that when a user enters their OTC, their secret MIP is not divulged. In the case of FIG. 3A, with 25 elements, if each sign is repeated five times, each number entered by the user corresponds to five possible different positions in the matrix. Consequently, the code "1, 2, 3, 4, 5" corresponds to 3125 possible different patterns. In the case of FIG. 3B, with the 12 element matrix, each letter corresponds to two possible positions in the matrix. Consequently, a four element code could represent 16 possible patterns. It is clear that the 25 element matrix, with a five element code and five unique signs is much more secure than the 12 element case.

Furthermore, any authentication system based upon a MIP keeps the pattern secret, in order to prevent hackers from gaining valuable information. Security of MPA technology is essential for their use, e.g. in any online system, especially in the case of financial transactions, access to personal data, etc. Consequently a method of storing sensitive information, particularly the user's MIP, must be employed.

The MIP is therefore usually encoded, in general by hashing. There are many public domain encoding algorithms available. The most appropriate algorithms employ a technique known as "one-way cryptographic hashing". This means that the sensitive information, in this case the MIP, once passed through a one-way hashing function, cannot be reversed. The sensitive information is encoded, and it is highly unlikely that anyone can retrieve the sensitive information. This means that even if a database with the encoded information is stolen, it would still be difficult to retrieve the sensitive information. Standard hashing algorithms (e.g. from the family SHA-2, such as SHA-256) and inclusion of at least one long salt should be applied to maximize the effectiveness of any encoding approach by hashing, and represents standard known best practice.

Typically, in MPA technology, each element 101 in the matrix 100 is given a unique symbol, in order to represent the position of the element 101 within the matrix 100. FIG. 4 shows a numeric indexing approach which is often utilized. For example, in the case of the 25 element matrix 100 of FIG. 1A, the elements might be numbered. In the example of FIG. 2A, the MIP would be represented by the code "e6, e22, e13, e4, e10".

FIG. 5 shows schematically that, in a known processing of the MIP, when a user U selects in S1 their MIP, once they have confirmed the selection, the code representing their pattern is usually encoded using a one-way hashing function, in S11, prior to being stored in S13 on a secure database 11, e.g. as a record. Preferably, the system will retain any non-coded record of the MIP in a volatile memory which will be immediately discarded after processing such as encoding. This has the desirable property that the only place where a not encoded record of the MIP is stored is in the user's mind.

The known MPA technology has however drawbacks or deficiencies.

Consider an example, with a six element MIP and a 36 element matrix 200 with six unique signs (i.e. 1, 2, 3, 4, 5 and 6), each repeated six times. An OTC entered by the user only ambiguously describes the MIP, as each digit of the OTC entered by the user represents six possible element positions on a challenge matrix 200. Therefore, in fact, any single six digit OTC describes $6^6=46,656$ possible MIPs.

Only one of these is correct, but an authentication engine has no a priori knowledge as to which of these is the right one, because of the one-way hashing. An authentication engine needs therefore to generate all of the potentially-valid MIP combinations represented by the entered OTC and, in a similar manner as is explained in reference to FIG. 5, each of these potentially-valid MIP combinations needs to be passed through the same encoding using the cryptographic one-way hashing function (as in S11), as the original MIP, prior to comparison with the encoded representation of the user's MIP stored in the database 11. Such repeated generations by encoding and comparisons need to continue until a match is found. It is only at this point that a positive authentication could be confirmed. The number of iterations required is random, albeit with a flat distribution. As a minimum, one iteration is required, as a maximum 46,656 iterations are required, in our example. Therefore on average 23,328 such iterations, comprising generation and comparison, will be required for a positive authentication.

This means that in the case of an incorrect OTC being entered by the user, the authentication system always has to perform the maximum number of iterations, in order to ensure that all possible valid combinations are examined, before eventually actually rejecting the authentication request. It is estimated that using the strong encoding algorithms that are necessary to defend against hackers (e.g. SHA-2), each individual encoding on an OTC takes between 0.1 ms and 1 ms on state of the art computer servers. Using 0.2 ms as a representative processing speed, and continuing with our example, an average authentication request would take between 5 to 10 seconds to approve, in the case of a valid one-time code being entered. In the case of an incorrect OTC being entered, the time taken to produce a rejection of an authentication request will always be approximately 10 seconds (i.e. 46,656×0.2 ms). In addition some secure system require to hash the MIP and/or password multiple times, which will further increase the processing time.

This processing overhead is unacceptable in a multi-user, cloud server environment, and the length of the MIP must be reduced.

However, simply reducing the length of the MIP is not a solution because a significant issue arises. That is any single individual authentication event performed for example on an individual authentication device 3 of FIG. 5 (such as a laptop, a personal computer, a Personal Digital Assistant, a phone, a smartphone, or a dedicated token, etc.) is now vulnerable under brute force attacks.

Furthermore, not reducing the length of the MIP is also not a solution because the encoding algorithms used to defend against hackers (e.g. SHA-2) are not sufficient to protect an individual authentication event performed for example on an individual authentication device 3 from brute force attacks.

Aspects of the disclosure address or at least ameliorate at least one of the above issues.

According to some aspects, the disclosure provides methods according to claims 1 and/or 12 and/or 14 and/or 24.

According to another aspect, the disclosure provides a device according to claim 42.

Aspects of the disclosure extend to computer program products such as computer readable storage media having instructions stored thereon which are operable to program a programmable processor to carry out a method as described in the aspects and possibilities set out above or recited in the claims and/or to program a suitably adapted computer to provide the system recited in any of the claims.

The disclosure has advantages over the prior art.

The processing overhead generated by the one way hashing is perfectly acceptable in any one individual authentication event for example performed on an authentication device (such as a laptop, a personal computer, a Personal Digital Assistant, a phone, a smartphone, or a dedicated token, etc.).

The device has numerous applications, and can be associated with any type of key code lock, the lock being either an electronic lock (for locking a transaction) or a mechanical lock (for locking a door or the opening of any device). The device may be used to lock or unlock access to sensitive data stored in the memory of the device and/or e.g. to launch, or control access to, any third party applications on a device as a non-limiting example. The sensitive data may be encrypted and the device may enable locking/unlocking of the encryption of the sensitive data. The locking and unlocking modes could be synchronized, respectively, with the device LOCKED/UNLOCKED states. In some examples, the user may override the LOCKED/UNLOCKED states of the device.

The disclosure enables the use of large square matrices which possess significantly greater entropy compared to known 5×5 matrices. For example, a 36 element (6×6) array has 2.1 billion potential combinations with a choice of six elements to make up a MIP. The disclosure also enables the use of MIP having a length of at least 6 elements, and therefore ensures that the probability of randomly guessing a MIP from an OTC at authentication is lower than the probability of randomly guess a classic four digit PIN (10,000:1). For example, with a choice of six signs each repeated six times in a challenge matrix, the probability of guessing the MIP in the random is 1/46,656 (46,656=6^6). Consequently the disclosure provides a MPA technology which has superior and sufficient entropy compared to the prior art, and also has superior and sufficient resistance to guessing an MIP compared to the prior art.

The processing overhead thus enables the authentication process not to be vulnerable under brute force attacks.

Additionally or alternatively, the identification of the device on which the challenge code is entered can also be taken into account, providing a two-factor system. Further, a biometric data, such as the voice of the user, can also be taken into account in the authentication operation, providing a three-factor system.

The disclosure has advantages in an offline security context.

In the context of offline security, the disclosure has the advantage of a long hashing processing time, which means that even if a hacker tries to perform a brute force attack, the challenge code would still be hard and long to process.

Embodiments of the disclosure will now be described, by way of example, with reference to the accompanying drawings in which:

FIGS. 1A and 1B, already discussed, schematically illustrate MPA matrices;

FIGS. 2A and 2B, already discussed, schematically illustrate MIP in the MPA matrices of FIGS. 1A and 1B, respectively;

FIGS. 3A and 3B, already discussed, schematically illustrate challenge matrices corresponding to the MPA matrices of FIGS. 1A and 1B, respectively;

FIG. 4, already discussed, schematically illustrates an exemplary indexing of the MPA matrix of FIG. 1A;

FIG. 5, already discussed, schematically illustrates an exemplary encoding of a MIP;

FIG. 6 schematically illustrates an example of a device implementing a method according to the disclosure, FIG. 7 is a diagram illustrating steps of an exemplary method performed by the device of FIG. 6;

In all of the Figures, similar parts or steps are referred to by like numerical references.

Figure 1A:
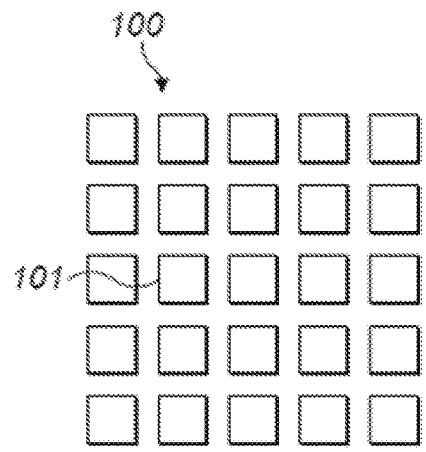
Figure 1B:
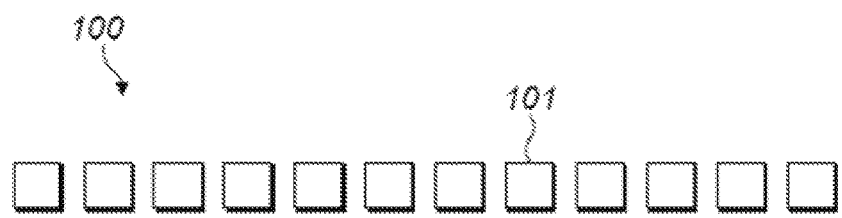
Figure 2A:
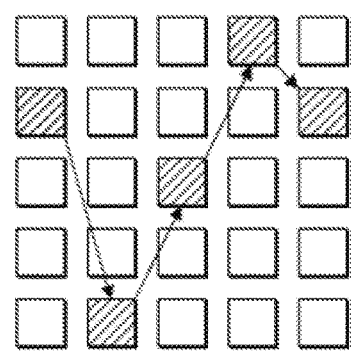
Figure 2B:
Figure 3A:
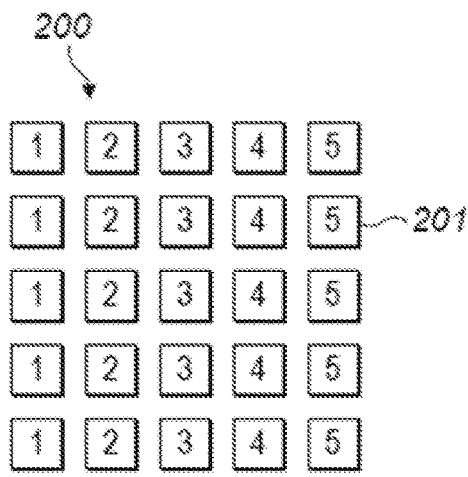
Figure 3B:
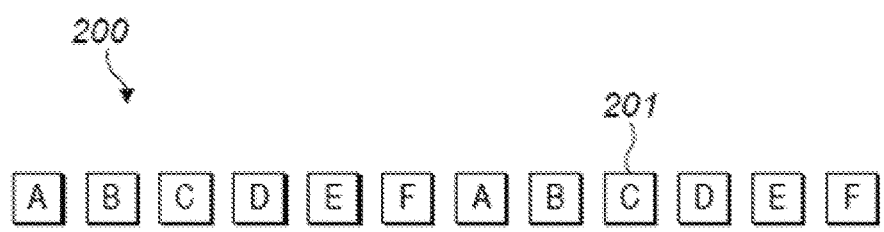
Figure 4:
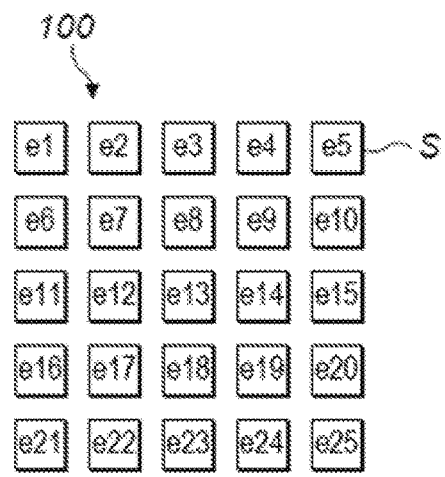
Figure 5:
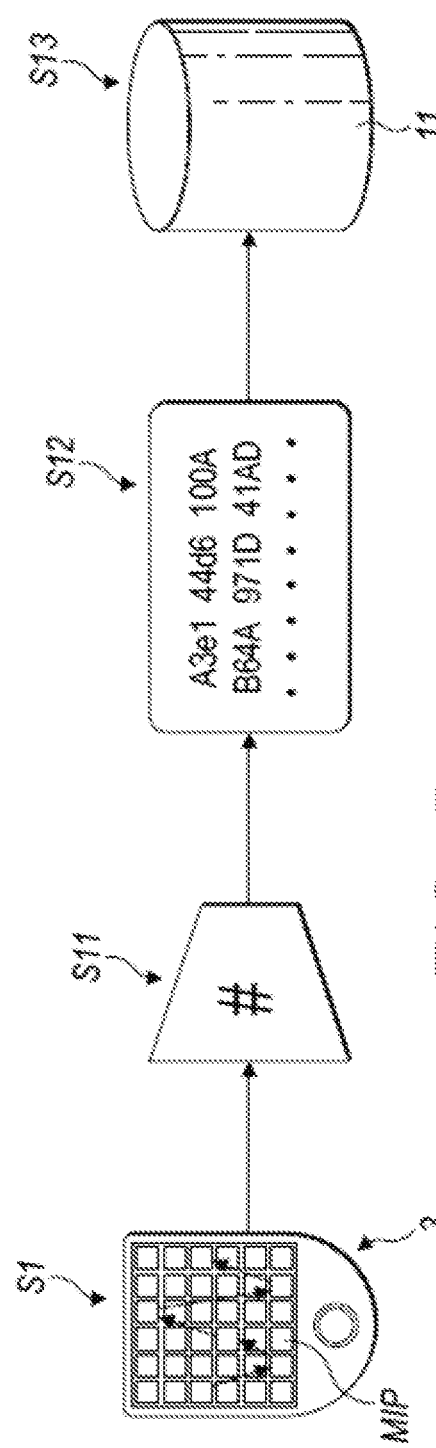
Figure 5:
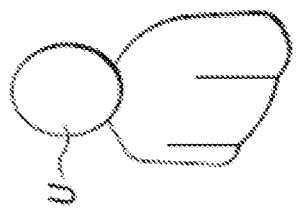

An aspect of the disclosure will now be described with reference to FIGS. 6 to 9.

The disclosure provides a method of encoding data 5. The data 5 may be created and/or received by a device 3 and/or stored in a memory 30 of the device 3. The memory 30 may comprise a non-volatile memory 33 and a volatile memory 34.

The data 5 may be of any type, and may be initially in a non-encoded format, i.e. accessible format, for example stored on the memory 30 of the device 3.

Figure 8:
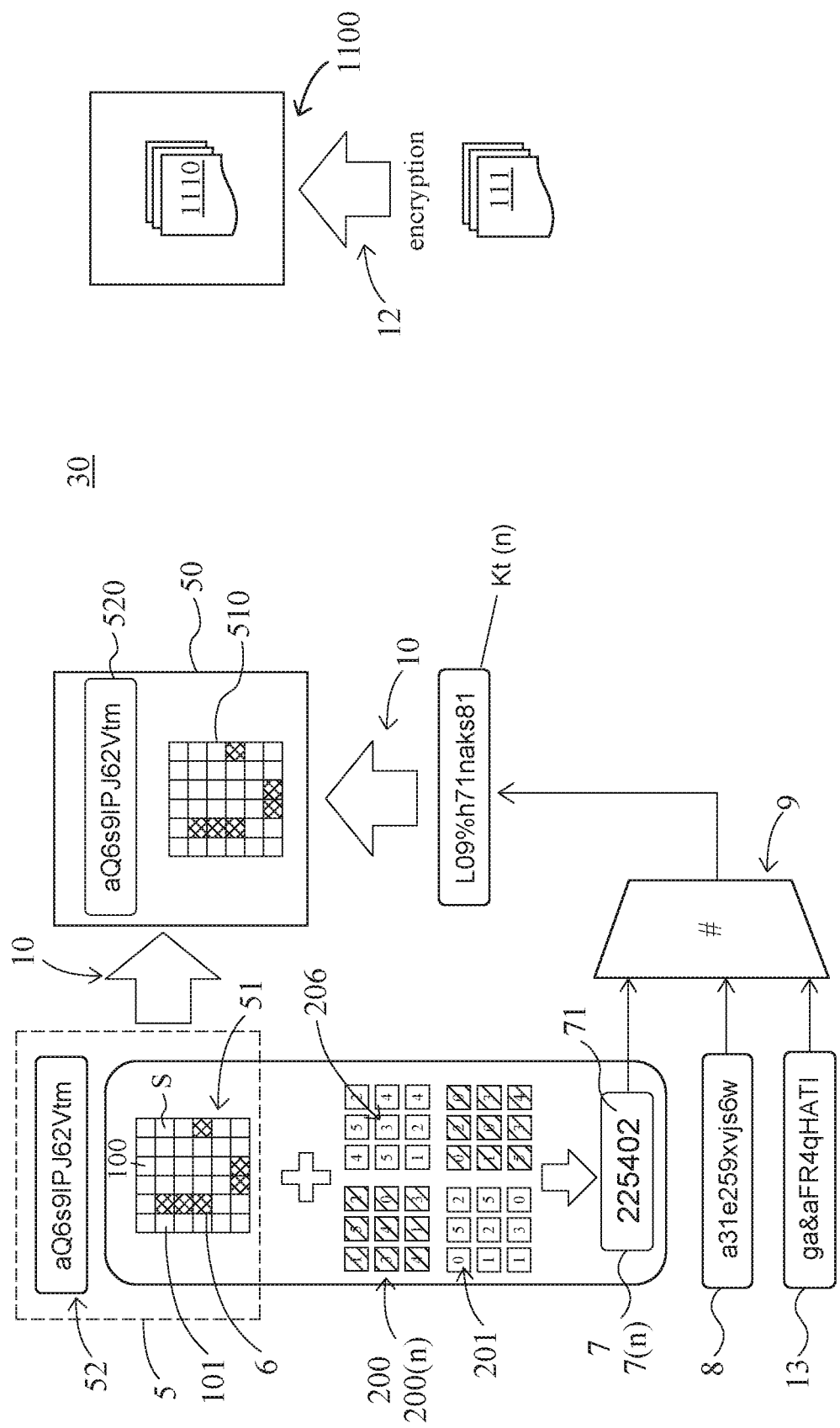
FIG. 8 is a diagram illustrating an exemplary method of FIG. 7.

As illustrated in FIG. 8, in some examples, the data 5 may comprise an authentication code 51 of a user U. The authentication code 51 may be of any type, such as a password. In some examples, the authentication code 51 of the user U may comprise elements e based on a memorable identification pattern, MIP, 6 associated with at least one authentication arrangement 100.

Figure 11:
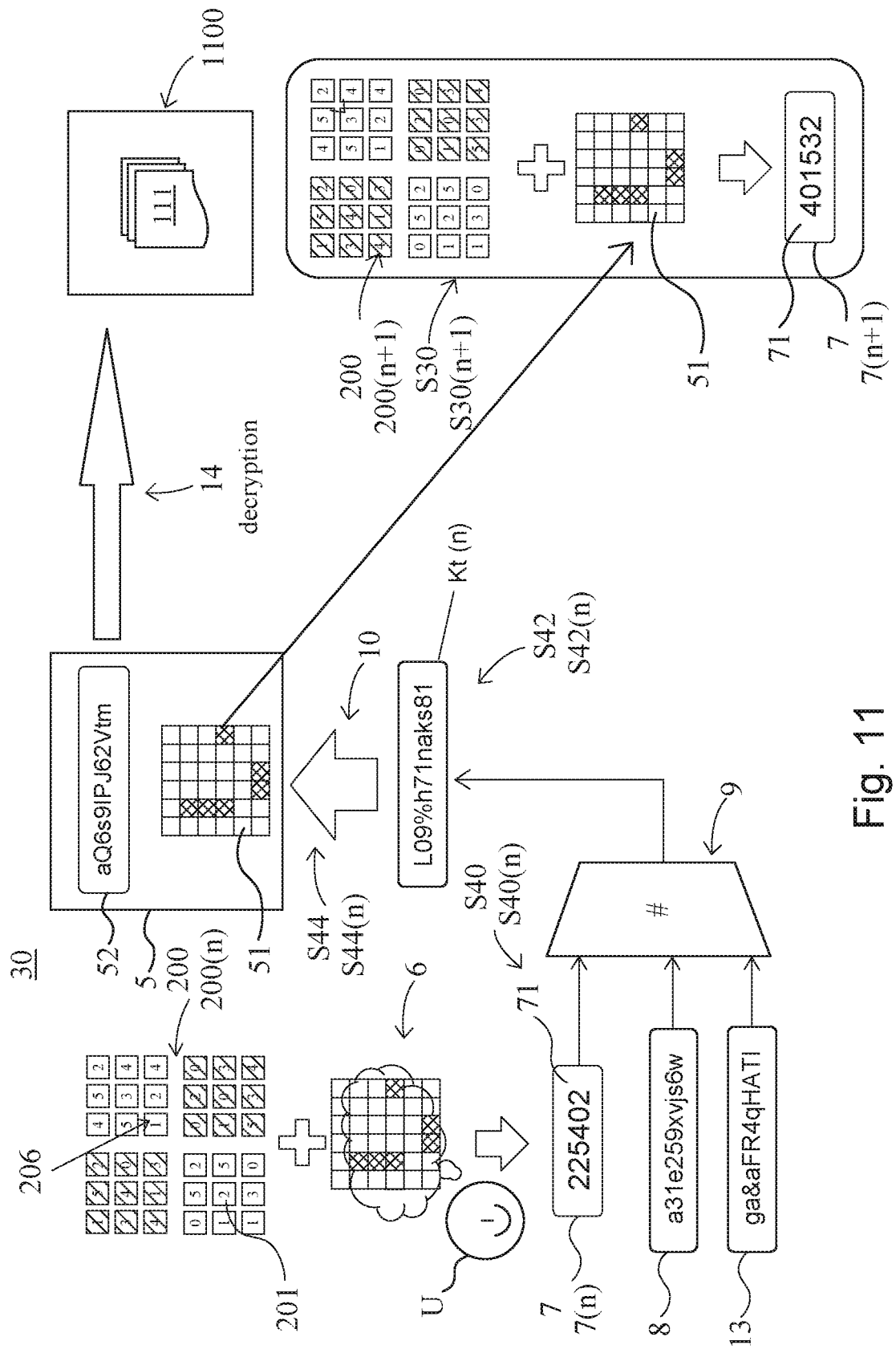
FIG. 11 is a diagram illustrating an exemplary method of FIG. 10.

Alternatively or additionally, in some examples, the data 5 may comprise a data encryption key 52 configured to encrypt, e.g. at 12 in FIG. 8, sensitive data 111 stored in the memory 30 of the device 3 and/or decrypt, e.g. at 14 in FIG. 11, encrypted sensitive data 1110 stored in the memory 30 of the device 3. In some examples, the encrypted sensitive data 1110 (i.e. the sensitive data 111 in encrypted format) may be stored in a secure data store 1100 of the memory 30 of the device 3. Alternatively or additionally, in some examples, the secure data store 1100 may be a sensitive data store, SDS. The sensitive data may be any type of data, such as data comprising files corresponding to a text, a picture, an audio and/or a video.

Figure 7:
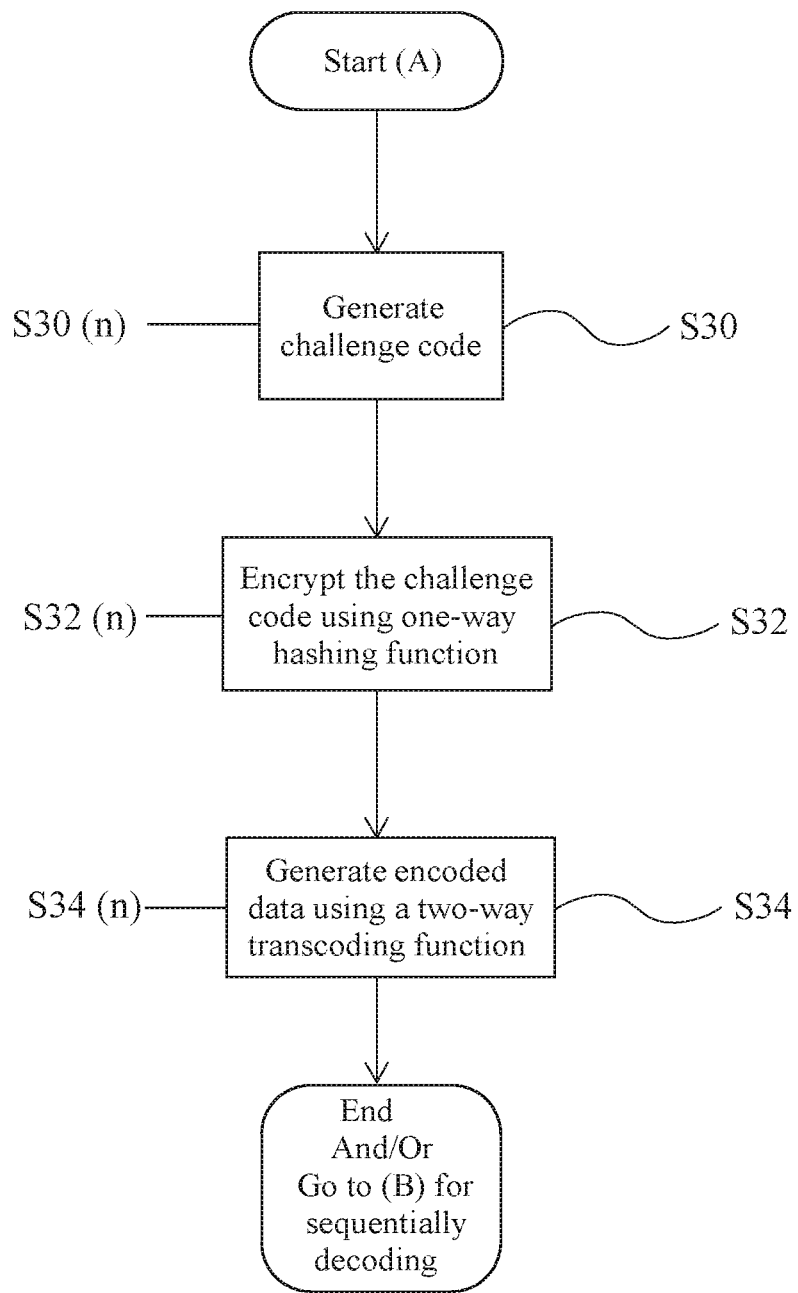

As illustrated in FIG. 7, in an example, the method of encoding the data 5 mainly comprises the steps of:
generating, at S30 (for example also referred to as S30(*n*) in FIG. 7), a challenge code 7 (sometimes referred to as "one-time code" (OTC), for example also referred to as challenge code 7(*n*) in FIG. 8);
encrypting, at S32 (for example also referred to as S32(*n*) in FIG. 7), the challenge code OTC 7 using a one-way hashing function 9 to obtain a temporary encryption key (sometimes referred to as "Kt", for example also referred to as Kt(n) in FIG. 8); and
generating encoded data 50 by encoding, at S34 (for example also referred to as S34(*n*) in FIG. 7), the data 5 using a two-way transcoding function 10 using the obtained temporary encryption key Kt.

As will be apparent to the skilled in the art, in the following specification, the device 3 further comprises at least a processor 35 in order to perform at least partly the different steps of the method. As explained in further detail below, the device 3 may be any type of device such as a laptop, a personal computer, a Personal Digital Assistant, a phone, a smartphone, or a dedicated token, etc.

In some examples, the device 3 may be linked to a network, and may preferably use wireless technology to communicate with the network. In that case, the device 3 may be configured to communicate with cellular base stations (using mobile technology) and/or other Wireless Access Points (using other wireless communications) such as WiFi, Bluetooth™ or near-field technology (also called sometimes "Near Field Communication" or "NFC"). The device 3 may also use wired access point (such as a wired modem) to communicate with the network. The communication between the device 3 and the network may preferably comply with Secure Socket Layer (SSL) or Transport Layer Security (TLS) protocols known by the skilled person in the art.

As will be apparent to the skilled person in the art, in the following specification, the device 3 also should not be understood as a limited natural entity, but may rather refer to physical devices comprising at least a processor and a memory, and the processor and the memory may be comprised in one or more apparatuses and/or servers which can be located in a single location or can be remote from each other to form a nebulous network (such as server farms). As already stated, the device 3 may therefore comprise for instance a laptop, a personal computer, a Personal Digital Assistant, a phone, a smartphone, etc., thus comprising a display 31 and an interface 32, for selecting the authentication code 51 and/or transmitting it to the network during a registration operation. In some examples, a single device 3 may perform the selecting of the authentication code 51 during the registration operation, and also the displaying of a challenge arrangement 200 to a user during an authentication operation. Alternatively or additionally, the device 3 may comprise a separate dedicated token comprising a display for displaying the challenge arrangement 200 to the user during the authentication operation.

Figure 6:
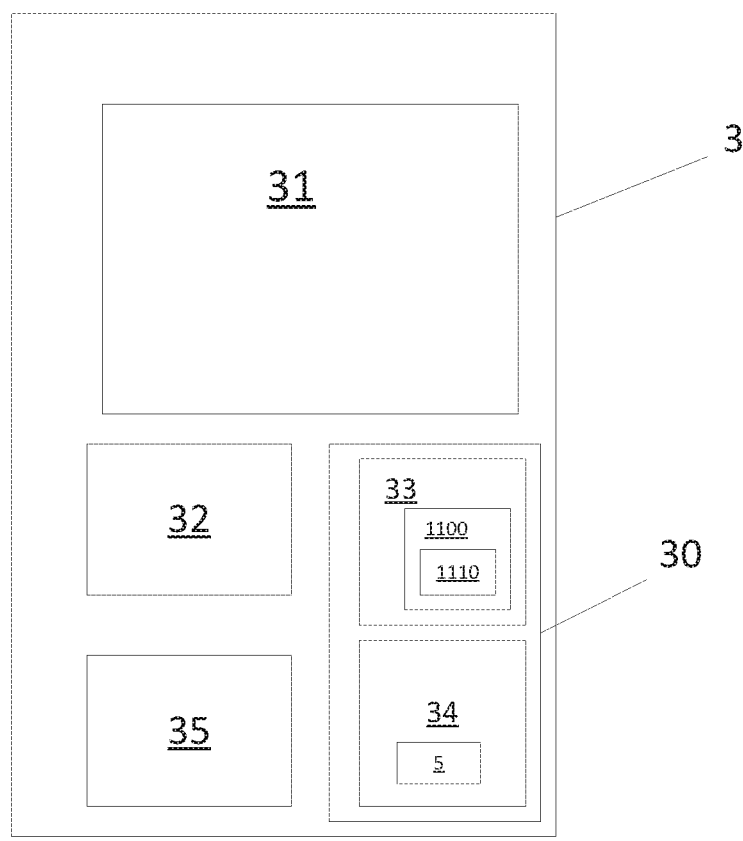

It should be appreciated that FIG. 6 shows functional block diagrams, and that in practice the individual blocks shown in FIG. 6 may exist as discrete elements or their functionality may be distributed in different combinations or not individually discernable. In that respect, some of the functionality of the device 3 may be distributed in different combinations or may be at least partially merged.

The authentication code 51 has a length L of at least six elements e, and users U are encouraged to have codes 51 greater than six if possible. The code 51 may be allocated to the user U by an administrator. However as already mentioned the device 3 is preferably configured to enable the user U to select their authentication code 51. Optionally, the code 51 is modified at user-configurable or administrator-configurable times, as variable code lengths are a strong security feature, adding significantly to entropy.

As illustrated in FIG. 8, the code 51 is associated with the memorable identification pattern MIP 6, based on an authentication arrangement 100, preferably but not exclusively used in a Matrix Pattern Authentication (MPA) 100 and the elements of the code 51 form a set of the elements of at least one authentication array or arrangement 100 comprising S symbols s, preferably unique symbols.

In some aspects of the disclosure, once the authentication code 51 is confirmed by the user U, e.g. on the device 3, the device 3 may save the code 51 in the memory 30 of the device 3.

In some examples, the data 5 may initially be stored in the volatile memory 34 of the device 3. This feature strengthens security because if the device 3 is switched off, the data 5 is lost and the encoding cannot be performed.

In some examples, the authentication code 51 may initially be stored in the volatile memory 34 of the device 3. Similarly, in some examples the data encryption key 52 may initially be stored in the volatile memory 34 of the device 3.

In some examples, the generated challenge code OTC 7 may be based on a pattern 206 associated with at least one challenge arrangement 200 comprising duplicated signs 201 (for example also referred to as challenge arrangement 200(n) in FIG. 8).

In some examples, obtaining at S30 the challenge code OTC 7 may comprise generating a sequence 7 of signs 71 corresponding to the elements 201, based on the MIP 6, and appearing in the challenge arrangement 200. The generating may be performed automatically by the processor 35 of the device 3.

Alternatively or additionally, the generating of the sequence 7 may comprise obtaining from the user U the sequence 7 of signs 71 in a dedicated space of an interface 32 of the device 3. In some examples, the device 3 may enable the user U to enter, during an authentication operation e.g. via any Human User interface mechanism, such as part of a logon process for a device 3 being a smartphone or an Internet browser, at least the one time code OTC 7, associated with the challenge array 200. As already stated, the OTC 7 comprises the signs 201 corresponding to the pattern 206 presented in the challenge matrix 200, as the user U enters, in the dedicated space of the interface 32, separate from the matrix 200, the signs corresponding to their secret MIP 6 and which appear in the matrix 200 of elements 201, in the correct order in which the signs appear in their MIP 6.

Preferably the device 3 may enable the user U to enter also any type of user identification. In some examples the device 3 is configured to belong to the user U such that entering of user identification may not be needed.

In some examples, the one-way hashing function 9 used at S32 may comprise a PBKDF2 algorithm. The function 9 may thus be a slow hashing algorithm, intensive with respect to the computation and/or the memory required. The function 9 may enable to reinforce protection against brute force attacks.

In some examples, the one-way hashing function 9 uses a salt 8. In some examples, the salt 8 may be stored in the memory 30 of the device 3. In some examples, the salt 8 may be stored in the non-volatile memory 33 of the device 3. Alternatively or additionally, in order to further security, the salt 8 may be stored only in the volatile memory 34 of the device 3, such that if the device 3 is switched off, the salt is lost and the encoding cannot be performed.

In some examples, additionally or alternatively, the one-way hashing function 9 uses a User Device ID 13 and furthers security of the one-way hashing function 9.

In some examples, the two-way transcoding function 10 may comprise an AES256 algorithm. The AES256 algorithm is a strong two-way transcoding algorithm. The algorithm may enable to reinforce protection against brute force attacks.

At S34, the encoded data 50 is generated by encoding the data 5 using the two-way transcoding function 10 using the obtained temporary encryption key Kt. In some examples, the encoded data 50 (i.e. the data 5 in encoded format) may be stored in a secure data store 50 of the memory 30 of the device 3. Alternatively or additionally, in some examples, the secure data store 50 may be an authentication information store, AIS.

Figure 9:
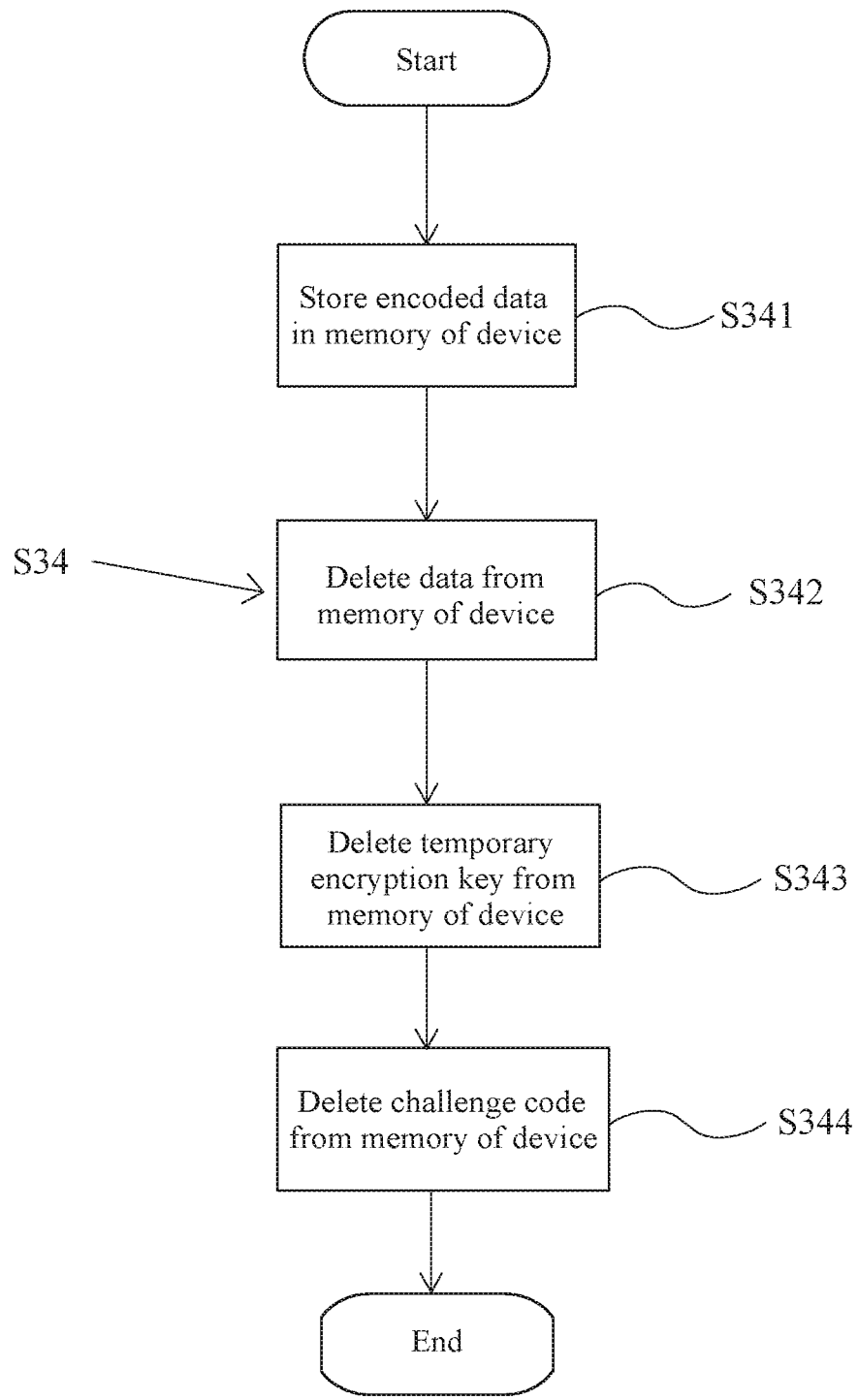
FIG. 9 is a diagram illustrating further steps of an exemplary method performed by the device of FIG. 6.

With reference to FIG. 9, in some examples, the encoded data 50 may be stored, at S341, in the memory 30 of the device 3, for example for use in an authentication of the user U as explained in further detail below. In some examples, the encoded data 50 may be stored in the non-volatile memory 33 of the device 3. The non-volatile memory 33 of the device 3 may thus comprise a dedicated store, such as an authentication information store where the encoded data 50 may be stored.

In some examples, alternatively or additionally, in order to further security, the data 5 may be deleted, at S342, from the memory 30 of the device 3 once the encoded data 50 is stored in the memory 30 of the device 3.

In some examples, alternatively or additionally, in order to further security, the temporary encryption key Kt may be deleted, at S343, from the memory 30 of the device 3 once the encoded data 50 is stored in the memory 30 of the device 3.

In some examples, alternatively or additionally, in order to further security, the temporary challenge code 7 (one time code OTC 7) may be deleted, at S344, from the memory 30 of the device 3 once the encoded data 50 is stored in the memory 30 of the device 3.

It is understood that, at the end of S34, access to the encoded data 50 is locked. In some examples, the encoded data 50 may comprise:

the encoded authentication code 510 (i.e. the authentication code in an encrypted format using e.g., an AES256 algorithm using the temporary encryption key Kt); and/or the encoded data encryption key 520 (i.e. the data encryption key in an encrypted format using e.g., an AES256 algorithm using the temporary encryption key Kt).

At the end of S34, when the data 5 stored in the memory of the device 3 is configured to encrypt sensitive data 111 stored in the memory 30 of the device 3 (for example when the data comprises a data encryption key 52), access to the encrypted sensitive data 1110 is locked, because access to the data 5 is locked—since the data 5 is stored in an encoded format as described above.

An aspect of the disclosure will now be described with reference to FIGS. 10 to 12 in connection with FIGS. 6 to 9 already discussed.

In some examples the disclosure provides a method of authentication of the user U of the device 3. As it will be appreciated below, in some examples, the authentication may result from a validation of an encoding of a challenge code.

Figure 10:
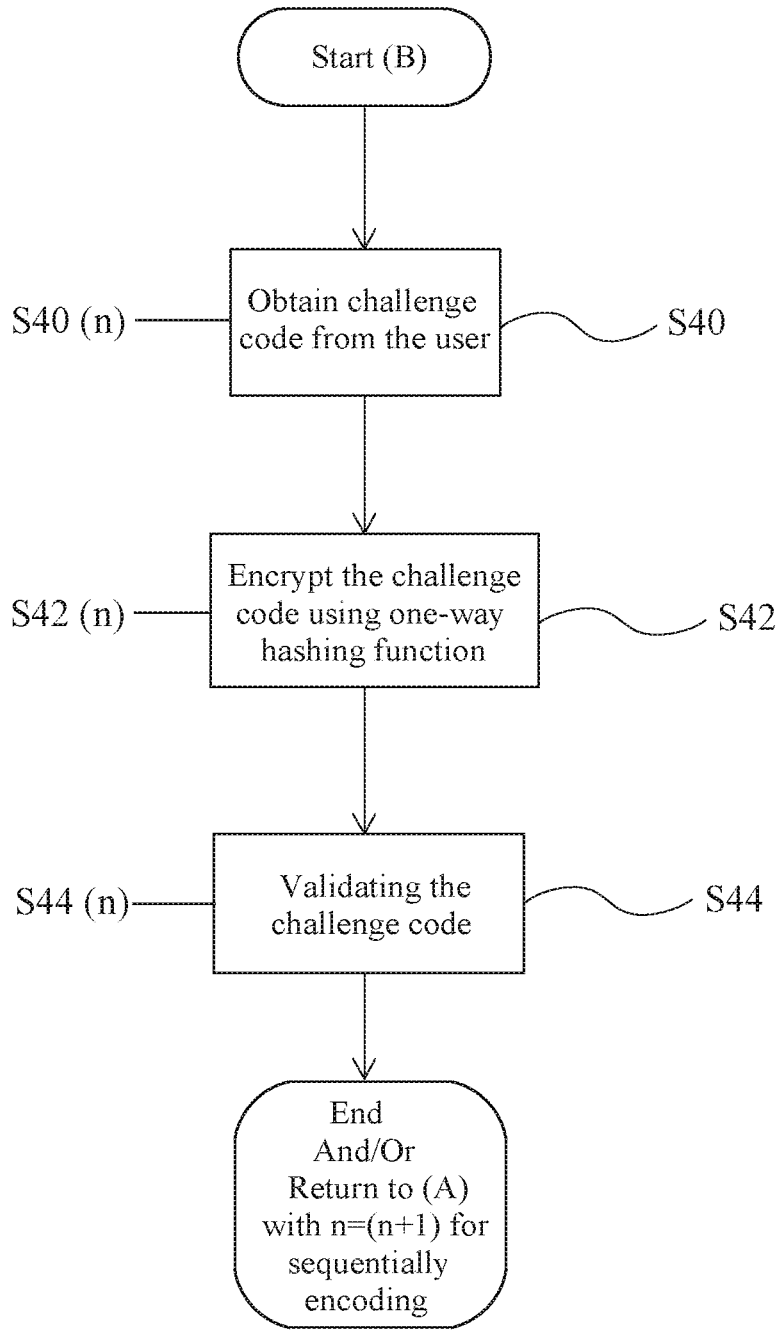
FIG. 10 is a diagram illustrating steps of an exemplary method performed by the device of FIG. 6.

As illustrated in FIG. 10, in some examples the method may mainly comprise the steps of:

obtaining, at S40 (for example also referred to as S40(n) in FIG. 10), a challenge code OTC 7 (for example also referred to as challenge code 7(n) in FIG. 11) from the user;

encrypting, at S42 (for example also referred to as S42(n) in FIG. 10), the challenge code OTC 7 using a one-way hashing function 9 to obtain a temporary encryption key Kt (for example also referred to as Kt(n) in FIG. 11); and validating, at S44 (for example also referred to as S44(n) in FIG. 10), the challenge code OTC 7 if the obtained temporary encryption key Kt(n) matches a temporary encryption key Kt(n) used to encode, for example at S34(n) already described in reference to FIG. 7, data 5 using a two-way transcoding function 10.

The encoded data 50 may be created and/or received by the device 3. In some examples, the encoded data 50 may be stored in the memory 30 of the device 3, for example in the non-volatile memory 33 of the device 3. In some examples, the encoded data 50 (i.e. the data 5 in encoded format) may be stored in a secure data store 50 of the memory 30 of the device 3. Alternatively or additionally, in some examples, the secure data store 50 may be an authentication information store, AIS.

With reference to FIG. 11, in some examples the challenge code 7 may be based on a pattern 206 associated with at least one challenge arrangement 200 comprising duplicated signs 201 (for example also referred to as 200($n$) in FIG. 11), as the user U enters, in the dedicated space of the interface 32, separate from the matrix 200, the signs 201 corresponding to their secret MIP 6 and which appear in the matrix 200 of elements 201, in the correct order in which the signs appear in their MIP 6.

In some examples, the one-way hashing function 9 used at S42($n$) may comprise a PBKDF2 algorithm. The function 9 may thus be a slow hashing algorithm, intensive with respect to the computation and/or the memory required. The function 9 may enable to reinforce protection against brute force attacks.

In some examples, the one-way hashing function 9 uses the salt 8. In some examples, the salt 8 may be stored in the memory 30 of the device 3. In some examples, the salt 8 may be stored in the non-volatile memory 33 of the device 3. Alternatively or additionally, in order to further security, the salt 8 may be stored only in the volatile memory 34 of the device 3, such that if the device 3 is switched off, the salt is lost and the validating cannot be performed.

In some examples, additionally or alternatively, the one-way hashing function 9 uses the User Device ID 13 and furthers security of the one-way hashing function 9.

In some examples, at S44($n$), the two-way transcoding function 10 may comprise an AES256 algorithm. The AES256 algorithm is a strong two-way transcoding algorithm. The algorithm may enable to reinforce protection against brute force attacks.

At S42($n$), if the obtained temporary encryption key Kt(n) matches the temporary encryption key Kt(n) used to encode, for example at S34($n$) already described in reference to FIG. 7, data 5 using the two-way transcoding function 10, it is understood that the OTC 7($n$) matches the OTC 7($n$). This is because, as explained in greater detail below, the challenge array 200($n$) of FIG. 7 matches the challenge array 200($n$) of FIG. 11. The OTC 7($n$) is thus validated. In other words the user U has entered the correct OTC 7, which means that they know the MIP 6 and access should thus be unlocked.

Figure 12:
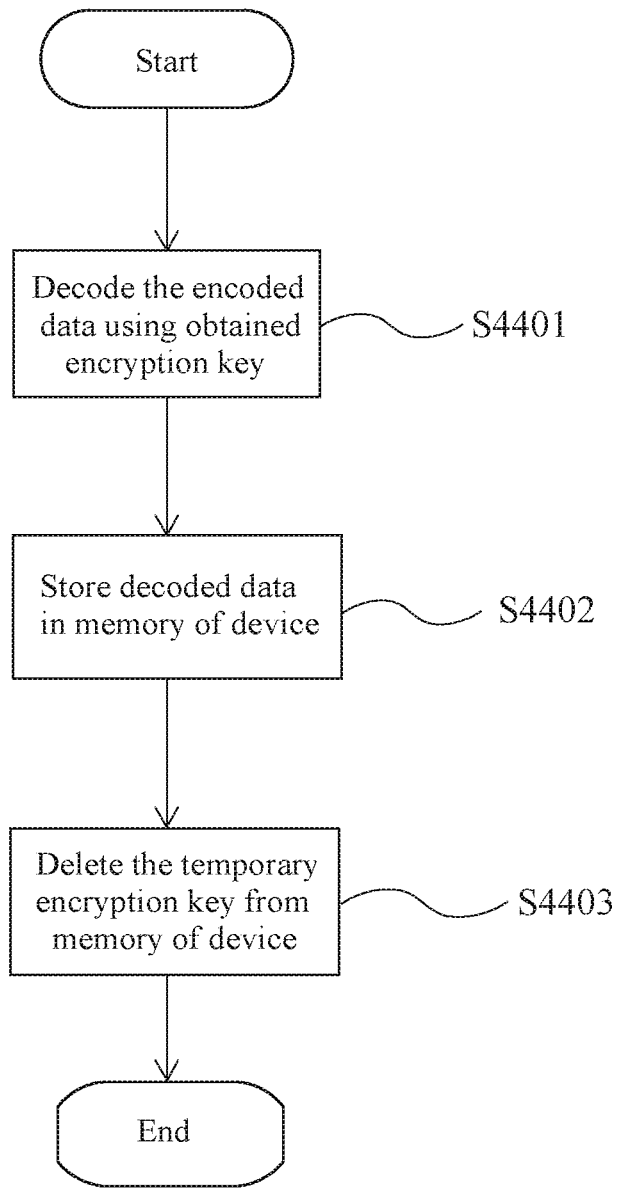
FIG. 12 is a diagram illustrating further steps of an exemplary method performed by the device of FIG. 6.

With reference to FIG. 12, alternatively or additionally, at S44($n$), if the OTC 7 is validated, the method may further comprise the decoding, at S4401, of the encoded data 50, using the obtained temporary encryption key Kt(n), in order to obtain decoded data 5. The data 5 may comprise the authentication code 51 of the user U and/or the data encryption key 52 configured to decrypt, e.g. at 14 in FIG. 11, encrypted sensitive data 1110 stored in the memory 30 of the device 3. In some examples, the encoded data 50 (i.e. the data 5 in encoded format) may be stored in a secure data store 50 of the memory 30 of the device 3. Alternatively or additionally, in some examples, the secure data store 50 may be an authentication information store, AIS.

In some examples, at S4402, the decoded data 5 (e.g. the data encryption key 52) may be stored in the memory 30 of the device 3. In some examples, to further security, the decoded data 5 may be stored in the volatile memory 34 of the device 3.

In some examples, at S4403, the obtained temporary encryption key Kt(n) may be deleted from the memory 30 of the device 3, so it cannot be used in a further encoding of data 5 stored in the memory of the device 3.

In some examples, the decoded data 5 may be configured to decrypt sensitive data 1110 stored in the memory 30 of the device 3 (for example when the data 5 comprises a data encryption key 52). The validation may therefore unlock access to the decrypted sensitive data 111, e.g. by allowing decryption 14 of the encrypted data in the store 1100 as illustrated in FIG. 11. The user may therefore read and/or write sensitive data 111 from and/or into the sensitive data store of the device 3. Alternatively or additionally, the user may launch, or control access to, any third party applications on a device as a non-limiting example.

The user may access (e.g. read and/or write) the sensitive data 111 from and/or into the sensitive data store of the device 3 as long as the decoded data 5 (e.g. the data encryption key 52) is stored in the memory 30 of the device 3 (e.g. in the volatile memory 34 of the device 3).

In some examples, alternatively or additionally, the method may comprise a new iteration of any of the methods shown in FIGS. 7, 8, 9, 10, 11 and/or 12.

In some examples, and as illustrated in FIG. 7 with n set to (n+1) and FIG. 11, the method may further comprise generating a subsequent challenge code OTC 7($n$+1) for a subsequent encoding of the decoded data 5. In some examples the subsequent challenge code 7($n$+1) may be based on a pattern 206 associated with at least one subsequent challenge arrangement 200($n$+1) comprising duplicated signs 201. As described with reference to FIGS. 7 and 8 with n being set to (n+1), the method may further comprise encrypting the subsequent challenge code 7($n$+1) using the one-way hashing function 9 to obtain a subsequent temporary encryption key Kt(n+1). As described with reference to FIGS. 7 and 8 with n being set to (n+1), the method may further comprise generating subsequent encoded data 50 by encoding the data 5 (the data 5 may comprise the authentication code 51 of the user U and/or the data encryption key 52) using the two-way transcoding function 10 using the obtained subsequent temporary encryption key Kt(n+1). In some examples, the generating, the encrypting and the generating as shown in FIGS. 7 and 8 with n being set to (n+1) may occur concurrently or shortly after the validating, at S44, of the challenge code OTC 7($n$).

With reference to FIG. 9, in some examples, the encoded data 50 (i.e. the data 5 in encoded format) may be stored in a secure data store 50 of the memory 30 of the device 3, e.g. at S341, concurrently or shortly after the validating, at S44, of the challenge code OTC 7($n$). Alternatively or additionally, in some examples, the secure data store 50 may be an authentication information store, AIS.

However the user may access (e.g. read and/or write) the sensitive data 111 from and/or into the sensitive data store of the device 3 and/or launch an application as long as, e.g. a copy of, the decoded data 5 (e.g. a copy of the data encryption key 52) is stored in the memory 30 of the device 3 (e.g. in the volatile memory 34 of the device 3). In other words, and with reference to FIG. 9, the data 5 may not be deleted straight away, at S342, from the memory 30 of the device 3 once the encoded data 50 is stored in the memory 30 of the device 3. In some example the data (e.g. a copy of the data) may be deleted after a period of time or after the device 3 is turned off, as non-limiting examples.

In some examples, alternatively or additionally, in order to further security, the temporary encryption key Kt may be deleted, at S343, from the memory 30 of the device 3 once the encoded data 50 is stored in the memory 30 of the device 3.

In some examples, alternatively or additionally, in order to further security, the temporary challenge code 7 (one time code OTC 7) may be deleted, at S344, from the memory 30 of the device 3 once the encoded data 50 is stored in the memory 30 of the device 3.

As shown in reference to FIGS. 8 and 11 with n set to (n+1), the subsequent challenge arrangement 200(*n*+1) may be, and preferably is, different from the current challenge arrangement 200(*n*).

It is also understood that the challenge arrangement 200 used in a following decoding (i.e. of rank (n+1) with reference to FIG. 11) matches the subsequent challenge arrangement 200(*n*+1).

It is thus understood that the new iteration of the steps of the method corresponds, as shown in FIG. 10, to a new iteration of the steps as described in reference to FIG. 7, with n set to (n+1).

Similarly, it is thus understood, in reference to FIGS. 7, 8, 10 and 11 with rank (n) describing the current stage, that in another aspect of the present disclosure, it is described a method of sequentially encoding and decoding data, comprising the steps of:
- generating a current challenge code 7(*n*) for a current encoding of the data 5, the current challenge code 7(*n*) being based on a pattern 206 associated with at least one current challenge arrangement 200(*n*) comprising duplicated signs 201;
- encrypting the current challenge code 7(*n*) using a one-way hashing function 9 to obtain a current temporary encryption key Kt(n);
- generating encoded data 50 by encoding the data 5 using a two-way transcoding function 10 using the obtained current temporary encryption key Kt(n);
- obtaining a user challenge code 7(*n*) from the user, the user challenge code 7(*n*) being based on the pattern 206 associated with the at least one current challenge arrangement 200(*n*) comprising the duplicated signs 201,
- encrypting the user challenge code 7(*n*) using the one-way hashing function 9 to obtain a user temporary encryption key Kt(n); and
- decoding the encoded data 50 using the two-way transcoding function 10 and the user temporary encryption key Kt(n) if the user temporary encryption key Kt(n) matches the obtained current temporary encryption key Kt(n) used to encode the data 5.

Similarly, it is thus understood, in reference to FIGS. 7, 8, 10 and 11 with rank (n) describing the current stage, that in another aspect of the present disclosure, it is described a method of sequentially encoding and decoding data, comprising the steps of:
- obtaining a current challenge code from the user for a current decoding of encoded data stored in the memory of the device, the current challenge code being based on a pattern associated with at least one current challenge arrangement comprising duplicated signs;
- encrypting the current challenge code using a one-way hashing function to obtain a current temporary encryption key;
- validating the current challenge code if the current temporary encryption key matches a previous temporary encryption key used to encode the data using the two-way transcoding function;
- decoding the encoded data using the two-way transcoding function and the current temporary encryption key;
- generating a subsequent challenge code for a subsequent encoding of the decoded data, the subsequent challenge code being based on a pattern associated with at least one subsequent challenge arrangement comprising duplicated signs;
- encrypting the subsequent challenge code using a one-way hashing function to obtain a subsequent temporary encryption key;
- generating subsequent encoded data by encoding the data using a two-way transcoding function using the obtained subsequent temporary encryption key.

In some examples, the steps of generating a subsequent challenge code for a subsequent encoding of the decoded data; encrypting the subsequent challenge code using a one-way hashing function to obtain a subsequent temporary encryption key; and generating subsequent encoded data by encoding the data using a two-way transcoding function using the obtained subsequent temporary encryption key may be performed concurrently or shortly after the step of decoding the encoded data using the two-way transcoding function and the current temporary encryption key.

The user may access (e.g. read and/or write) the sensitive data 111 from and/or into the sensitive data store of the device 3 as long as the decoded data 5 or a copy of the decoded data 5 (e.g. the data encryption key 52) is stored in the memory 30 of the device 3 (e.g. in the volatile memory 34 of the device 3).

Figure 13:
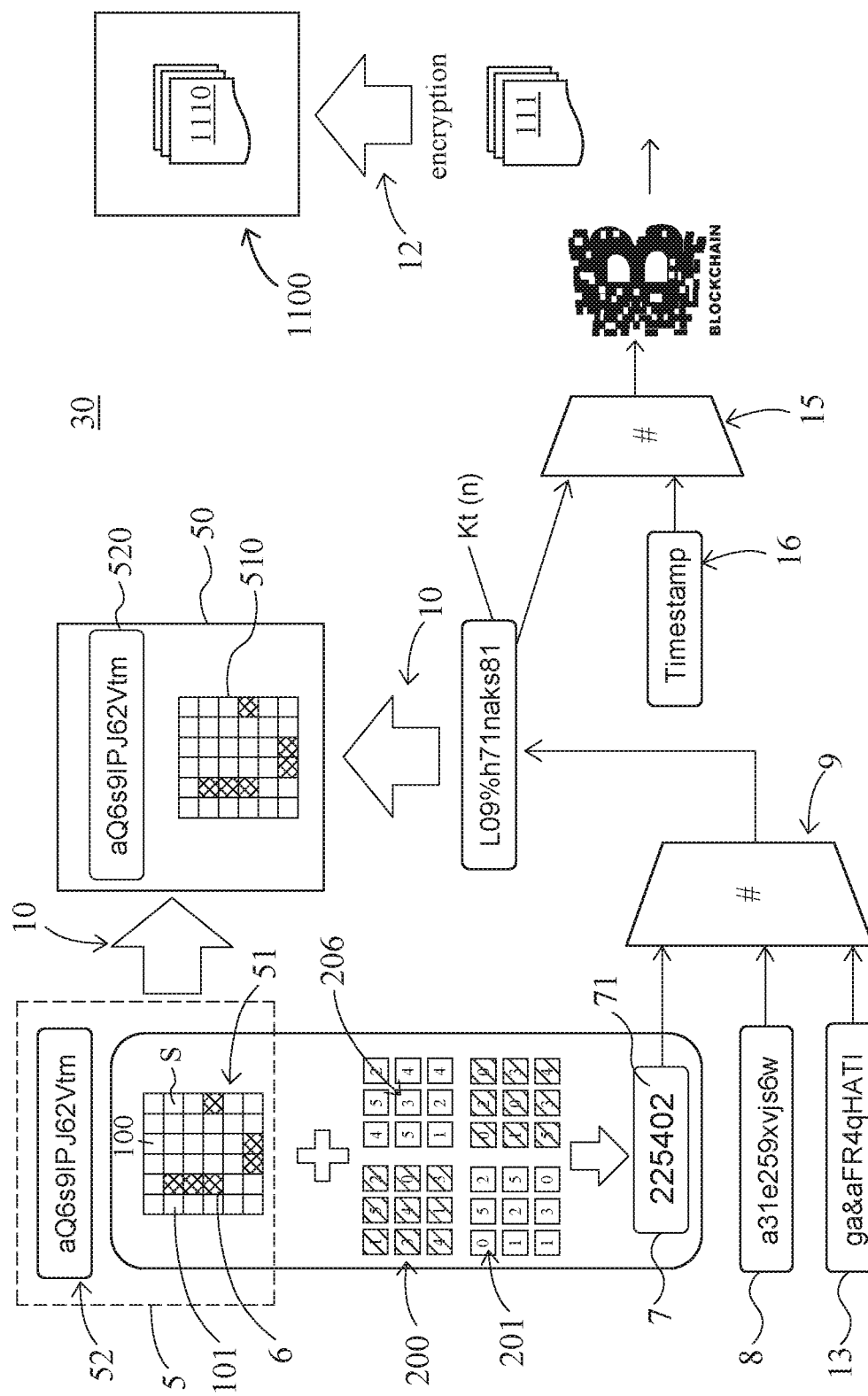
FIG. 13 is a diagram illustrating an exemplary method of creating a blockchain of transactions.

As illustrated in FIG. 13, the method may further comprise a step 15 of creation of a blockchain of transactions (such as encoding data and/or decoding data). It should be understood that at each iteration n (e.g. authentication) a new temporary encryption key Kt(n) is generated, which itself may be optionally timestamped at 16, and hashed to create a blockchain history of authentication events. This may create a blockchain of transactions which may have strong authentication built into each transaction. In some examples, a local copy of the authentication history can be kept on the device 3, and/or a copy of the blockchain may be shared with any third party blockchain application.

In embodiments of the disclosure, all authentication steps may be performed on the (e.g. mobile) device 3 only. The method may be Operating System (OS) agnostic, such that no OS jailbreaking may be necessary.

In some embodiments, the method may further comprise a step of either delete and/or make unreadable information in the secure data store, in the event of compromise.

In embodiments of the disclosure, work load of an operator may be minimized, and several authentication steps may be avoided.

As already explained below, the disclosure applies to any authentication arrangement 100 of size S used in any MPA system, not only those of a square form factor. However in some examples the array may have a square form factor and:

$$L=6$$

$$S=36.$$

The disclosure provides therefore offline security, because the hashing processing time is sufficiently long.

Table 1 below shows the processing time required to process the MIP, based on an indicative 0.2 ms per hashing operation.

TABLE 1

| MIP length | Indicative processing time |
| --- | --- |
| 6 | 9.2 s |
| 7 | 56 s |

TABLE 1-continued

| MIP length | Indicative processing time |
|---|---|
| 8 | 6 mins |
| 9 | 33 mins |
| 10 | 3.3 hrs |
| 11 | 20 hrs |
| 12 | 5 days |

The length of the authentication code enables achieving acceptable offline security. Therefore the disclosure enables the use of MPA of square form factors and with MIP of a length L with L≥6.

In some aspects of the disclosure, each authentication arrangement 100 has a square form factor a, wherein $$a \geq 6$$

with a being a linear dimension of the matrix, each matrix having a size S equal to $a^2$ elements 101.

The disclosure can be applied to an optimal family of matrices of length (or size) S, wherein a balance between the uniqueness of signs s (providing a high level of entropy) and non-reversability of the OTC (given by the duplication of the signs s) is given by the solution of equation (E2):

$$n = \frac{S}{n} \quad (E2)$$

where n is the number of times each different type of signs are replicated in each challenge arrangement 200, and
S/n is the number of different signs in each challenge arrangement 200 (also referred to as m below).
The solution of (E2) is:

$$n = \sqrt{S}$$

Therefore preferably each challenge arrangement 200 has a square form factor a, wherein $$m = n = a$$

and $$a \geq 6$$

with a being a linear dimension of the matrix, each matrix having a size S equal to $a^2$ elements 201;
m (=S/n) being the number of different signs in each challenge arrangement 200; and
n being the number of times each different type of signs are replicated in each challenge arrangement 200.

The MPA according to the disclosure has better practical entropy compared to a one dimensional linear array or arrangement.

As stated above, the disclosure enables the use of an ideal configuration which has a square pattern and is therefore advantageous compared to a rectangular array which tends to suppress entropy.

Also as stated above, the disclosure enables the use of the ideal configuration where each symbol of the challenge matrix is repeated n=sqrt(S) times, where S is the number of elements (or the size) in the challenge matrix. Thus, it is desirable that a matrix has a number of elements that is a square number, i.e. 4, 9, 16, 25, 36, 49, 64, 81 etc. This is to ensure that signs in a matrix are repeated an integer number of times, with no bias in favour of any particular sign. Such a bias would compromise security effectiveness.

However the disclosure is not limited to n=√S. The use of m unique signs, with m≠n≠a is also possible and sometimes advantageous. For example, in a matrix with a=6 (36 elements), the case m=9, with n=4 (each of the nine signs is repeated four times) is also possible and sometimes advantageous. Other examples for a, m or n are possible.

Preferably "a" is an integer number between six and ten, for example nine unique signs in a 9×9 matrix, and so on.

Therefore a 36 element array with 6 unique different signs with each sign being repeated six times (i.e. a 6×6×6×6 configuration) with a six element MIP is the minimum configuration that has sufficient entropy, having the further advantage of having the property that the probability of guessing a correct OTC (i.e. 1/46,656) is much better than guessing a conventional four-digit PIN number.

Modifications and Alternatives

As already described, the authentication operation performed on the device 3 may take into account device identification 13. It is therefore sometimes referred to as a two-factor device. Identification of the device 3 may comprise any unique identification, hereafter referred to as 13, such as a serial number of any part of the device and/or an International Mobile Equipment Identity (IMEI), etc.

Preferably, both a type of device and/or a selected device and a type of authentication operation and/or a selected authentication operation are user-configurable or operator-configurable. The user U may therefore e.g. choose one of his registered devices 3 for authentication regarding bank transactions and another one of his registered devices 3 for online payments. The operator may also e.g. ban a type of devices for highly secure transactions. Alternatively or additionally, the salt and/or the data encryption key maybe user-configurable and/or operator-configurable and/or application-configurable.

The device 3 may be adapted to read and/or recognize biometric data from the user U. The device 3 may thus be a three-factor device. The biometric data maybe a voice and/or a shape of the face and/or the image of the iris, and/or a fingerprint of the user U.

The present disclosure may be applied to any form of secret information, and the authentication code described above may be any secret information, such as passwords, passcodes, and personal information, including biometric information.

It is understood that the authentication code described in the specification is not limited to an authentication code derived from a MPA. The authentication code of a user may further be any type of password, number, ID, etc. It is understood that the processing of the authentication codes and challenge codes, such as encoding, decoding and storing according to the disclosure may be performed on any type of such authentication code and challenge codes.

Detailed embodiments have been described above. As those skilled in the art will appreciate, a number of modifications and alternatives can be made to the above embodiments whilst still benefiting from the disclosures embodied therein.

In the embodiments described above, the processor is typically implemented as software run by a corresponding controller. However, in some embodiments, the processor may be formed, where appropriate, by hardware, software, firmware or any combination thereof. A software implementation may however be preferred to facilitate the updating of the functionality of the processor.

Where software are provided, they may be provided, as appropriate, in compiled or un-compiled form and may be supplied to the processing module, the authentication engine or to the device, as the case may be, as a signal over a computer or telecommunications network, or on a computer storage medium such as for instance a disc, an optical disc or a CD ROM.

It should of course be appreciated that, although not explicitly shown in FIG. 6, the processor will have all of the functionality necessary to enable it to operate as the processor, in the particular device in which it is designed to function.

Various other modifications will be apparent to those skilled in the art and will not be described in further detail here.

The invention claimed is:

1. A method of encoding data, comprising:
   generating a challenge code,
   wherein the challenge code is a one-time code (OTC) that changes on each authentication operation,
   the challenge code being based on a secret, user-defined memorable identification pattern (MIP) that appears in at least one challenge arrangement comprising duplicated signs;
   wherein the challenge arrangement includes a challenge matrix populated with a randomized set of the duplicated signs and the randomized set of the challenge matrix changes on each authentication operation;
   wherein the generating of the challenge code includes obtaining the challenge code from a user;
   wherein the obtaining of the challenge code includes receiving, from the user in a dedicated space of an interface, signs corresponding to the secret memorable identification pattern (MIP) that appear in the challenge matrix;
   wherein the dedicated space is separate from the challenge matrix in the interface;
   encrypting the challenge code using a one-way hashing function to obtain a temporary encryption key, wherein the encrypting includes:
   using the one-way hashing function to obtain the temporary encryption key, wherein the one-way hashing function uses a salt and a user device identification, and
   using the temporary encryption key to encrypt an authentication code corresponding to the challenge code and to further encrypt a data encryption key;
   generating encoded data by encoding the data using a two-way transcoding function using the obtained temporary encryption key, the encoded data comprising the encrypted authentication code and the encrypted data encryption key;
   creating a blockchain of encoding and decoding data, wherein the creating the blockchain includes encrypting the temporary encryption key and a timestamp of the temporary encryption key, wherein the blockchain creates a history of iterations of authentication operations for encoding and decoding data by logging every obtained temporary encryption key and its associated time stamp for each iteration of authentication;
   storing the encoded data in a memory of a device, for use in an authentication of the user; and deleting the data, the temporary encryption key and the challenge code after the encoded data is stored in the memory of the device.

2. The method of claim 1, wherein the data is initially stored in a volatile memory of the device.

3. The method of claim 1, wherein the encoded data is stored in a non-volatile memory of the device.

4. The method of claim 3, wherein the non-volatile memory of the device includes an authentication information store.

5. The method of claim 1, wherein the data is configured to encrypt sensitive data stored in the memory of the device, thereby locking access to the sensitive data without the data.

6. The method of claim 5, wherein the sensitive data is stored in a non-volatile memory of the device.

7. The method of claim 6, wherein the sensitive data is stored in a secure data store of the memory of the device.

8. The method of claim 1, wherein the generating of the challenge code comprises: generating a current challenge code for a current encoding of the data based on a pattern associated with at least one current challenge arrangement comprising duplicated signs, wherein the at least one current challenge arrangement matches a challenge arrangement used in at least one subsequent decoding of the encoded data.

9. The method of claim 1, wherein the one-way hashing function comprises a Password-Based Key Derivation Function 2 (PBKDF2) algorithm.

10. The method of claim further comprising:
    storing the salt in the memory of the device; or
    deleting the salt from the memory of the device after the encoded data is stored in the memory of the device.

11. The method of claim 1, wherein the two-way transcoding function comprises an Advanced Encryption Standard 256 (AES256) algorithm.

12. The method of claim 1, wherein the data comprises: the data encryption key configured to encrypt sensitive data stored in a secure data store of memory of a device.

13. The method of claim 1, wherein at least one authentication arrangement and/or at least one challenge arrangement is a matrix used in a matrix pattern authentication (MPA).

14. The method according to claim 13, wherein each challenge arrangement has a square form factor a, and wherein
    with a being a linear dimension of the matrix, each matrix having a size S equal to $a^2$ elements;
    m being a number of different signs in each challenge arrangement; and
    n being a number of times each different type of signs is replicated in each challenge arrangement.

15. The method according to claim 13, wherein each challenge arrangement may have a square form factor a, and wherein:
    with a being a linear dimension of the matrix, each matrix having a size S equal to $a^2$ elements;
    m being a number of different signs in each challenge arrangement; and
    n being a number of times each different type of signs is replicated in each challenge arrangement.

16. The method according to claim 13 wherein each authentication arrangement has a square form factor a, and wherein $a \geq 6$ with a being a linear dimension of a matrix, each matrix having a size S equal to $a^2$ elements.

17. The method of claim 1, wherein the user device identification includes a serial number of any part of a device and/or an International Mobile Equipment Identity, IMEI.

18. The method of claim 1, wherein the challenge matrix is at least a 36 element array, and the MIP has a length of at least 6 elements.

19. A method of sequentially encoding and decoding data, comprising: generating a current challenge code for a current encoding of the data, the current challenge code being based on a user defined, secret memorable identification pattern (MIP) associated with at least one current challenge arrangement comprising duplicated signs; encrypting the current challenge code using a one-way hashing function to obtain a current temporary encryption key, wherein the encrypting includes using the one-way hashing function to obtain the current temporary encryption key, wherein the one-way hashing function uses a salt and a user device identification, and using the current temporary encryption key to encrypt an authentication code corresponding to the current challenge code and to further encrypt a data encryption key, creating a blockchain of encoding data and decoding data, wherein the creating the blockchain includes encrypting the current temporary encryption key and a timestamp of the current temporary encryption key, wherein the blockchain creates a history of iterations of authentication operations for encoding and decoding data by logging every obtained temporary encryption key and its associated time stamp for each iteration of authentication;

generating encoded data by encoding the data using a two-way transcoding function using the obtained current temporary encryption key, the encoded data comprising the encrypted authentication code and the encrypted data encryption key;

storing the encoded data in a memory of a device, for use in an authentication of the user and deleting the data, the current temporary encryption key and the current challenge code after the encoded data is stored in the memory of the device;

obtaining a user challenge code from a user, wherein the user challenge code is a one-time code (OTC) that changes on each authentication operation, the user challenge code being based on a pattern associated with the least one current challenge arrangement comprising the duplicated signs, wherein the challenge arrangement includes a challenge matrix populated with a randomized set of the duplicated signs;

wherein the obtaining of the user challenge code includes receiving from the user in a dedicated space of an interface signs corresponding to the secret memorable identification pattern (MIP) that appear in the challenge matrix, wherein the dedicated space is separate from the challenge matrix in the interface;

encrypting the user challenge code using the one-way hashing function, the salt and the user device identification to obtain a user temporary encryption key; and decoding the encoded data using the two-way transcoding function and the user temporary encryption key when the user temporary encryption key matches the obtained current temporary encryption key used to encode the data.

20. The method of claim 19, further comprising:
generating a subsequent challenge code for a subsequent encoding of the decoded data, the subsequent challenge code being based on the pattern associated with at least one subsequent challenge arrangement comprising duplicated signs, or wherein the subsequent challenge arrangement is different from the current challenge arrangement.

21. A method of authentication of a user of a device, comprising:
obtaining a challenge code from the user,
wherein the challenge code is a one-time code (OTC) that changes on each authentication operation,
the challenge code being based on a secret, user defined memorable identification pattern (MIP) associated with at least one challenge arrangement comprising duplicated signs, wherein the challenge arrangement includes a challenge matrix populated with a randomized set of the duplicated signs and the randomized set of the challenge matrix changes on each authentication operation;

wherein the obtaining of the challenge code includes receiving from the user in a dedicated space of an interface signs corresponding to the secret memorable identification pattern (MIP) that appear in the challenge matrix, wherein the MIP is only known to the user;

wherein the dedicated space is separate from the challenge matrix in the interface;

encrypting the challenge code using a one-way hashing function to obtain a temporary encryption key, wherein the encrypting includes using the one-way hashing function to obtain the temporary encryption key, wherein the one-way hashing function uses a salt and a user device identification, storing the temporary encryption key in memory of the device, and using the temporary encryption key to encrypt an authentication code corresponding to the challenge code and to further encrypt a data encryption key;

validating the challenge code when the obtained temporary encryption key matches the temporary encryption key used to encode data using a two-way transcoding function, creating a blockchain of the encoded data, wherein the creating the blockchain includes encrypting the temporary encryption key and a timestamp of the temporary encryption key, wherein the blockchain creates a history of iterations of authentication operations by logging every obtained temporary encryption key and its associated time stamp for each iteration of authentication;

decoding an encoded data using the two-way transcoding function and the obtained temporary encryption key when the obtained temporary encryption key matches a previously obtained temporary encryption key used to encode the data, wherein the decoded data comprises the authentication code and the data encryption key; and deleting the temporary encryption key from the memory of the device after the validating the challenge code.

22. The method of claim 21, further comprising:
decoding encoded data using the obtained temporary encryption key to obtain decoded data.

23. The method of claim 22, wherein the decoded data is configured to decrypt sensitive data stored in the memory of the device, thereby unlocking access to the sensitive data.

24. The method of claim 21, wherein the encoded data is stored in a non-volatile memory of the device.

25. The method of claim 21, further comprising:
storing the decoded data in a memory of the device.

26. The method of claim 25, wherein the memory is a volatile memory.

27. The method of claim 21, wherein the memory is a volatile memory.

28. The method of claim 27, wherein the memory comprises a secure data store.

29. The method of claim 21, wherein the obtaining of the challenge code comprises: obtaining the challenge code for a current validating of the challenge code based on pattern associated with at least one current challenge arrangement comprising duplicated signs, wherein the at least one current challenge arrangement matches a challenge arrangement used in a previous generating of the encoded data.

30. The method of claim 21, wherein the obtaining the challenge code from the user comprises: generating a sequence of signs corresponding to elements based on the memorable identification pattern (MIP) and appearing in the challenge arrangement.

31. A method of sequentially decoding and encoding data, comprising:
 obtaining a current challenge code from a user for a current decoding of encoded data stored in memory of a device,
 wherein the current challenge code is a one-time code (OTC) that changes on each authentication operation,
 the current challenge code being based on a pattern associated with at least one current challenge arrangement comprising duplicated signs, wherein the current challenge arrangement includes a challenge matrix populated with a randomized set of the duplicated signs and the randomized set of the challenge matrix changes on each authentication operation;
 wherein the obtaining the current challenge code includes receiving from the user in a dedicated space of an interface signs corresponding to a secret memorable identification pattern (MIP) that appear in the challenge matrix, wherein the dedicated space is separate from the challenge matrix in the interface, wherein the MIP is only known to the user;
 encrypting the current challenge code using a one-way hashing function to obtain a current temporary encryption key, wherein the encrypting includes using the one-way hashing function to obtain the current temporary encryption key, wherein the one-way hashing function uses a salt and a user device identification, storing the current temporary encryption key in memory of a device, and
 using the current temporary encryption key to encrypt an authentication code corresponding to the current challenge code and to further encrypt a data encryption key,
 creating a blockchain of the encoding and decoding data, wherein the creating the blockchain includes encrypting the current temporary encryption key and a timestamp of the current temporary encryption key, wherein the blockchain creates a history of iterations of authentication operations by logging every obtained temporary encryption key and its associated time stamp for each iteration of authentication;
 validating the current challenge code when the current temporary encryption key matches a previous temporary encryption key used to encode the data using the two-way transcoding function;
 decoding the encoded data using the two-way transcoding function and the current temporary encryption key, wherein the encoded data comprising the encrypted authentication code and the encrypted data encryption key;
 deleting the current temporary encryption key from the memory after the decoding the encoded data;
 generating a subsequent challenge code for a subsequent encoding of the decoded data, the subsequent challenge code being based on a pattern associated with at least one subsequent challenge arrangement comprising duplicated signs;
 encrypting the subsequent challenge code using the one-way hashing function, the salt and the user device identification to obtain a subsequent temporary encryption key; and
 generating subsequent encoded data by encoding the data using the two-way transcoding function using the obtained subsequent temporary encryption key.

32. The method of claim 31, further comprising:
 storing the subsequent encoded data in the memory of the device.

33. The method of claim 31, further comprising: obtaining a further subsequent challenge code from the user for a subsequent decoding of subsequent encoded data, the further subsequent challenge code being based on a pattern associated with the at least one subsequent challenge arrangement comprising the duplicated signs.

* * * * *

UNITED STATES PATENT AND TRADEMARK OFFICE
CERTIFICATE OF CORRECTION

PATENT NO. : 11,601,291 B2
APPLICATION NO. : 15/733242
DATED : March 7, 2023
INVENTOR(S) : Steven Jonathan Brittan Page 1 of 1

It is certified that error appears in the above-identified patent and that said Letters Patent is hereby corrected as shown below:

In the Claims

Column 16, Claim 10, Line 24, replace "10. The method of claim further comprising:" with
--10. The method of claim 1, further comprising:--

Column 16, Claim 14, Line 40, replace "wherein" with
--wherein
$$m = n = \alpha$$
and
$$\alpha \geq 6$$--

Column 16, Claim 15, Line 49, replace "wherein" with
--wherein:
$$m \neq n \neq \alpha$$
and
$$\alpha \geq 6$$--

Signed and Sealed this
Ninth Day of May, 2023

*Katherine Kelly Vidal*

Katherine Kelly Vidal
*Director of the United States Patent and Trademark Office*